(12) United States Patent 　　(10) Patent No.:　US 12,698,099 B2
　　Razakarivony 　　　　　　　　　　　　(45) Date of Patent:　Aug. 4, 2026

(54) METHOD FOR MONITORING THE STATE OF HEALTH OF AN AIRCRAFT TURBOMACHINE

(71) Applicant: SAFRAN, Paris (FR)

(72) Inventor: Sébastien Philippe Razakarivony, Moissy Cramayel (FR)

(73) Assignee: SAFRAN, Paris (FR)

( * ) Notice: Subject to any disclaimer, the term of this patent is extended or adjusted under 35 U.S.C. 154(b) by 120 days.

(21) Appl. No.: 18/851,532

(22) PCT Filed: Mar. 27, 2023

(86) PCT No.: PCT/FR2023/050432
　　§ 371 (c)(1),
　　(2) Date: Sep. 26, 2024

(87) PCT Pub. No.: WO2023/187287
　　PCT Pub. Date: Oct. 5, 2023

(65) Prior Publication Data
　　US 2025/0214718 A1　　Jul. 3, 2025

(30) Foreign Application Priority Data
　　Mar. 28, 2022　(FR) ...................................... 2202755

(51) Int. Cl.
　　*B64F 5/60*　　　(2017.01)
　　*F01D 21/00*　　　(2006.01)
(52) U.S. Cl.
　　CPC ............... *B64F 5/60* (2017.01); *F01D 21/003* (2013.01)
(58) Field of Classification Search
　　CPC .......... B64F 5/60; F01D 21/003; F01D 21/14; F05D 2260/80; F05D 2260/81; F05D 2260/82
　　See application file for complete search history.

(56) References Cited

U.S. PATENT DOCUMENTS

| | | | |
|---|---|---|---|
| 9,176,926 B2 | 11/2015 | Lacaille | |
| 2004/0123600 A1* | 7/2004 | Brunell | ................ G05B 13/042 |
| | | | 60/773 |

(Continued)

FOREIGN PATENT DOCUMENTS

| | | |
|---|---|---|
| EP | 2 623 747 B1 | 8/2014 |
| EP | 2 676 176 B1 | 11/2019 |

(Continued)

OTHER PUBLICATIONS

International Search Report as issued in International Patent Application No. PCT/FR2023/050432, dated Jul. 4, 2023.

*Primary Examiner* — Behrang Badii
(74) *Attorney, Agent, or Firm* — CUSHMAN PARTNERS, LLC

(57)　　　　　ABSTRACT

A method for monitoring the state of health of an aircraft turbomachine for a flight of interest VI, based on a setpoint vector XSC of input parameters relative to the turbomachine of interest in steady-state regime, the method using a database of values of input and output parameters in transient regime for a plurality of flights including the flight of interest, and values of input and output parameters in steady-state regime for a plurality of flights with the exception of the flight of interest. The transient data are used to estimate a transient prediction model f, at least one portion of the transient prediction model f then being used, associated with the steady-state data, in order to estimate a steady-state prediction model H of the turbomachine of interest for the flight of interest and to determine the behaviour, in steady-state regime, of the turbomachine for the flight of interest.

15 Claims, 2 Drawing Sheets

(56)                     References Cited

U.S. PATENT DOCUMENTS

| | | | | |
|---|---|---|---|---|
| 2008/0154823 A1* | 6/2008 | Volponi | ................. | G05B 17/02 |
| | | | | 706/45 |
| 2010/0196137 A1* | 8/2010 | Horn | .................... | F04D 29/164 |
| | | | | 415/115 |
| 2018/0297718 A1 | 10/2018 | Adibhatla | | |

FOREIGN PATENT DOCUMENTS

| | | | | |
|---|---|---|---|---|
| FR | 3 028 331 | A1 | 5/2016 |
| FR | 3 035 232 | A1 | 10/2016 |
| FR | 3 095 424 | A1 | 10/2020 |

* cited by examiner

[FIG. 1]
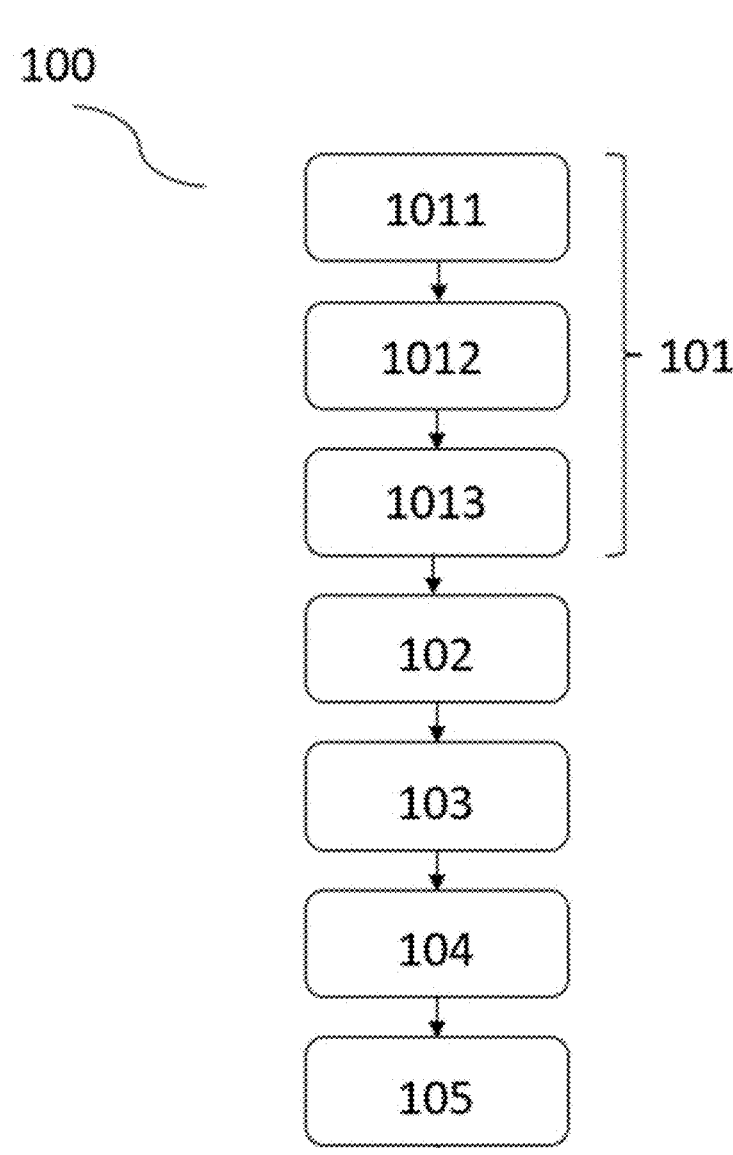

[Fig. 2]
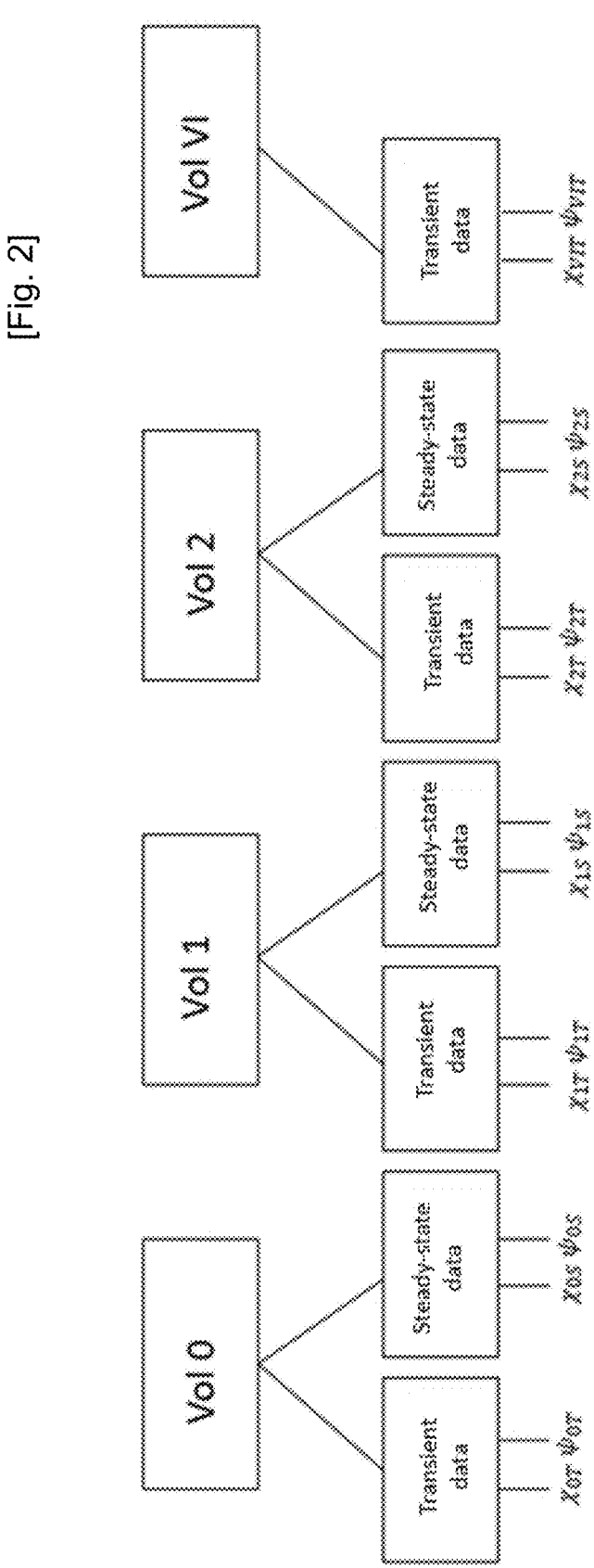

METHOD FOR MONITORING THE STATE OF HEALTH OF AN AIRCRAFT TURBOMACHINE

CROSS-REFERENCE TO RELATED APPLICATIONS

This application is the U.S. National Stage of PCT/FR2023/050432, filed Mar. 27, 2023 which in turn claims priority to French patent application number 2202755 filed Mar. 28, 2022. The content of these applications are incorporated herein by reference in their entireties.

TECHNICAL FIELD OF THE INVENTION

The technical field of the invention is that of monitoring the state of aircraft turbomachines.

The present invention relates to a method for monitoring the state of health of aircraft turbomachines.

TECHNOLOGICAL BACKGROUND OF THE INVENTION

Health monitoring of a turbomachine of an aircraft, for example an aeroplane or an helicopter, makes it possible to monitor the state of the turbomachine throughout its life and to anticipate a fault in the turbomachine from data recorded during flights made by the aircraft comprising the turbomachine.

A conventional indicator of health monitoring is the margin calculation for comparing, for a desired value of at least one input parameter relating to the turbomachine, a modelled theoretical value of at least one output parameter relating to the turbomachine with an actual value of said output parameter. For example, to obtain a desired power P emitted by the turbomachine, a physically modelled temperature $T_0$ in the combustion chamber of the turbomachine is theoretically required. The temperature $T_0$ is compared with an actual temperature $T_1$ in the combustion chamber of the turbomachine required to obtain power P emitted by the turbomachine. The actual temperature $T_1$ increases over the life cycle of the turbomachine, and the difference between the theoretical value $T_0$ and the actual value $T_1$ is a margin that is studied and analysed using physical models, for anticipating, for example, possible failure and overheating of the turbomachine. The margin calculation can be carried out for several input parameter values (for example a speed of rotation of a first shaft of the turbomachine and a speed of rotation of a second shaft of the turbomachine) and several output parameter values (for example the power emitted by the turbomachine and the previously discussed temperature of the turbomachine).

Physical models make it possible to study the margins with parameter data relating to the turbomachine recorded during steady state of the turbomachine. However, a helicopter, for example performing surveillance or slinging, may rarely or never operate at steady state during a particular flight, making margin calculations complex or even impossible.

Patent application FR3028331A1 describes a regression-based monitoring algorithm. An unsupervised classification of exogenous variables (environmental parameters) differentiates flight contexts. For each class of exogenous conditions, a regression model is provided to normalise endogenous data (engine parameters) and neutralise the impact of exogenous variations. Thus all the flights are iso-context and de facto comparable. They find the steady-state phases of all the flights as a function of a distance from a set of stable reference phases, then calculate average physical parameters for each phase that they can track over time. The application uses an algorithm for representing exogenous data (in the form of classes) with the purpose of dispensing with the flight context and makes it possible to distinguish between several relevant stable phases.

Patent EP2623747B1 provides a check device for automatically carrying out an engine health check on an aircraft turboshaft engine, comprising a step of acquiring a (mechanical) parameter for monitoring the turboshaft engine with guidance control (the method automatically determines whether the current phase is appropriate for making a data listing and warns the pilot that acquisition is in progress) and a step of evaluating health of the engine in relation to reference parameters (measured on a test bench or theoretical). The patent describes an invention based on physical models of engine operation in predefined phases. The invention described in EP2623747B1 makes it possible to automatically detect the relevant phases and to compensate for the lack of relevant phases during a flight.

In order to compensate for the lack of steady-state data from a helicopter turbomachine, solutions for monitoring state of the engine from indicators other than the margins or other ways of processing data that are less focused on physical modelling exist in the state of the art.

For example, patent EP2676176B1 provides a method for monitoring an aircraft engine using endogenous data (relating to the engine) and exogenous data (relating to the environment) recorded during the flight. Each flight is standardised by the exogenous variables to have a comparable context between flights (see for example FR3035232A1), then compressed and projected onto a self-adapting Kohonen map. For a flight of interest, the map is used to find a similar flight from the past and statistically analyse any drift in engine behaviour between the two. In patent EP2676176B1, the flight data representation is used to search for past data similar to the observed data and analyse drift. The solution in EP2676176B1 is distinguishable by the passive search for drift in the projected data and the use of a single specific representation method. This solution is more precisely described in the paper Aircraft engine health monitoring using Self-Organizing Maps, E. Côme, M. Cottrell, M. Verleysen, and J. Lacaille (2010).

Furthermore, patent application US20180297718A1 provides a method for monitoring the health of a turboshaft engine. The mechanism is as follows: acquiring initial data used as a reference defining the healthy engine, in different phases of use; acquiring data during the life of the apparatus; comparing with a module calculating a difference between the "healthy" parameters and the new parameters. Setting up a maintenance alarm. Using trade knowledge and definition of the healthy state. Using physical parameter drift per phase of flight.

One alternative to the solutions provided above, which is also known in the state of the art, is based on estimating, from input parameter values relating to the transient-state turbomachine during a given flight, output parameter values relating to the steady-state turbomachine. The solution enables two parameters relating to the turbomachine to be transformed independently of each other in order to obtain output parameter values in steady-state for given input parameters. However, the solution provided only works for one pair of parameters (input, output) at a time and each parameter is transformed independently of the other to obtain a pair of parameters (input, output) in steady state. Furthermore, the margin can therefore only be calculated on the transformed parameters, and not for any value of the input parameters, which further limits a relevant margin calculation.

There is therefore a need to estimate behaviour of the steady-state turbomachine, from one or more input parameters relating to the transient-state turbomachine, without considering the input and output parameters independently of each other, or two by two.

SUMMARY OF THE INVENTION

The invention offers a solution to the problems previously discussed, by making it possible to estimate more effectively the steady-state behaviour of a turbomachine for a particular flight.

One aspect of the invention relates to a computer-implemented method for monitoring the state of health of an aircraft turbomachine of interest TMI for a flight of interest VI of the aircraft, from a setpoint matrix $X_{SC}$ comprising at least one value of at least one input parameter relating to the turbomachine of interest TMI, the method including the following steps of:

Constructing a training database comprising:
- a so-called transient set T including transient learning data recorded during at least one flight recording instant of at least one flight V of at least one turbomachine TM operating in transient state and of the flight of interest of the turbomachine of interest TMI;
- a so-called steady-state set S including steady-state learning data recorded at each flight recording instant of each flight V, except the flight of interest VI, of each turbomachine TM operating in steady state;

Estimating a transient prediction model f on the transient learning data of the transient set T;

Estimating a steady-state prediction model H from the transient prediction model f and the steady-state learning data included in the steady-state set S.

Estimating a matrix of interest $Y_{SI}$ representing the steady-state behaviour of the turbomachine of interest TMI for the flight of interest VI from the steady-state prediction model H, at least a part of the transient prediction model f and the setpoint matrix $X_{SC}$;

Estimating the state of the turbomachine of interest from a margin calculation dependent on the matrix of interest $Y_{SI}$.

The model f may consist of one or more transient prediction submodels, which may or may not be specific to particular data sets.

The prediction model H can be formed from one or more steady-state prediction models, described below.

By "input parameter relating to a turbomachine", it is meant a parameter relating to the turbomachine for which a setpoint value is desired.

By "behaviour of a steady-state turbomachine for a flight V", it is meant the estimation of at least one output parameter relating to the turbomachine, an output parameter being a consequence of one or more input parameters of the turbomachine and of the state of the turbomachine.

A margin is a physical trade indicator which, using experience feedback and physical knowledge, informs the after-sales service about the state of the engines. Thus, the margin thus calculated (simulated/generated) by the invention is either displayed in a viewing tool on a computer and analysed by an operator, or analysed in an algorithmic pipeline in a computer in order to formally deduce its trend, and alert an operator to the state of health of the engine being monitored. Advantageously, the invention makes it possible to have more available points to be analysed, compensating for the absence of steady-state data, and therefore enabling better visual analysis by the operator or better calculation of the trend and therefore a better estimate of the state of health of the engine being monitored.

Thanks to the invention, the steady-state behaviour of a turbomachine of interest, for any flight of interest, can be estimated from transient and steady-state data relating to at least one transient and steady-state turbomachine for a plurality of flights, using the steady-state prediction model H. Thus, unlike the state of the art, the invention does not simply make it possible to predict output data relating to the steady-state turbomachine only under the conditions encountered, but a model making it possible to predict the output data from any setpoint, the estimation of the model H thus enabling margins to be calculated at different points rather than being restrained to a transformation of the transient variables and thus enabling the state of the turbomachine to be monitored for any flight of interest. Calculating the margins at different points makes it possible to have more available analysis points, and therefore to have a more precise analysis with less noise.

Advantageously, the invention allows all the data relating to the turbomachine to be taken into account at once rather than in pairs. Thus, taking all the variables rather than pairs into account results in a model that is more faithful to reality, and therefore reduces estimation errors. The decrease in estimation errors means allows margins being more precise and relevant in relation to the analysis.

Advantageously, the invention enables the construction of a steady-state prediction model $H_{VI}$ that enables margins to be calculated at different points rather than being restrained to a transformation of the transient variables. Producing this model gives much greater flexibility in exploiting results. Thus, it is not a simple transformation of data but a complete modelling of the turbomachine that is available, allowing a multi-point analysis of operation.

Further to the characteristics just discussed in the previous paragraph, the method according to one aspect of the invention may have one or more additional characteristics among the following, considered individually or according to any technically possible combinations:

- the transient learning data of the set T are constructed, for each flight V of each turbomachine TM, from a pair $(\chi_{VT}, \psi_{VT})$:
  - the matrix $\psi_{VT}$, comprising at least one row and at least one column, each row corresponding to an input parameter of the transient-state turbomachine TM, each input parameter of each row being different from the other input parameters of the other rows, each column corresponding to a recording instant of the flight V, each recording instant of each column being different from the other recording instants of the other columns,
  - the matrix $\psi_{VT}$, comprising at least one row and at least one column, each row corresponding to an output parameter of the transient-state turbomachine TM, each output parameter of each row being different from the other input parameters of the other rows, each column corresponding to a recording instant of the flight V, each recording instant of each column being different from the other recording instants of the other rows,
- the steady-state learning data of the set S are constructed, for each flight V of each turbomachine TM, except the flight of interest, from the pair $(\chi_{VS}, \psi_{VS})$:

the matrix $\chi_{VS}$, comprising at least one row and at least one column, each row corresponding to an input parameter of the transient-state turbomachine TM, each input parameter of each row being different from the other input parameters of the other rows, each column corresponding to a recording instant of the flight V, each recording instant of each column being different from the other recording instants of the other columns, the matrix $\psi_{VS}$, comprising at least one row and at least one column, each row corresponding to an output parameter of the transient-state turbomachine TM, each output parameter of each row being different from the other input parameters of the other rows, each column corresponding to a recording instant of the flight V, each recording instant of each column being different from the other recording instants of the other columns.

the turbomachine TM is the turbomachine of interest. Thus, among the pairs of matrices $(\chi_{VT}, \psi_{VT})$ of the transient set T, at least one of these pairs represents a flight of the turbomachine of interest. This characteristic makes it possible to include data relating to the turbomachine of interest for at least one flight, making it possible to estimate the prediction model f, the model f making it possible to determine the behaviour for one flight from data recovered from the turbomachine of interest. This step makes it possible to incorporate the current behaviour of the turbomachine under consideration, and ensures that the model is not a simple abstract model but a model of the behaviour of this particular machine, with all the available information.

A flight V of the set T is the flight of interest VI of the turbomachine of interest and the set T is further constructed from the pair $(\chi_{VIT}, \psi_{VIT})$. This characteristic of including parameters relating to the turbomachine of interest for the flight of interest, enabling the prediction model f to be estimated, makes it possible to represent the turbomachine of interest for the flight of interest. This inclusion of these particular data makes it possible to obtain a behaviour of the model representative of reality, and therefore to have trade margins that correspond to reality, namely the actual state of this turbomachine.

for each flight V of each turbomachine TM in the set T:
the transient learning data of the set T comprise the pair $(\chi_{VT}, \psi_{VT})$:
the transient prediction model f is formed by at least one submodel $f_v$, such that $f_v(\chi_{VT}) = \psi_{VT}$.

According to one embodiment complementary to the first embodiment, the steady-state prediction model H is defined such that, for each flight V of each turbomachine TM of the set S, $H(fv(\chi_{VS}), \chi_{VS}) = \psi_{VS}$ According to one embodiment, the transient learning data of the set T comprise:
A matrix $X_T$ resulting from horizontal concatenation of each matrix $\chi_{VT}$,
A matrix $Y_T$ resulting from horizontal concatenation of each matrix $\psi_{VT}$,
the transient prediction model f is defined such that $f(X_T) = Y_T$.

the steady-state learning data of the set S comprise:
A matrix $X_S$ resulting from horizontal concatenation of each matrix $\chi_{VS}$,
A matrix $Y_S$ resulting from horizontal concatenation of each matrix $\psi_{VS}$, and the steady-state prediction model H is defined such that $H(f(X_S), X_S) = Y_S$.

estimating a steady-state prediction model H from the transient prediction model f and the steady-state learning data included in the steady-state set S comprises the following sub-steps of:

For each flight V of each turbomachine TM, except the flight of interest VI, estimating a steady-state prediction model $H_V$ from the transient prediction model f and the steady-state learning data of each flight recording instant of the flight V, included in the steady-state set S;

Constructing a steady-state prediction model $H_{VI}$ for the flight of interest VI, from at least one steady-state prediction model Hc estimated for a flight C, the flight C being one flight of the flight or flights V;

The steady-state prediction model H being the steady-state prediction model $H_{VI}$.

for each flight V of each turbomachine TM of the steady-state set S, except the flight of interest VI of the turbomachine of interest TMI:
the steady-state learning data of the set S comprise the pair $(\chi_{VS}, \psi_{VS})$
the steady-state prediction model $H_V$ is defined such that, $Hv(f(\chi_{VS}), \chi_{VS}) = \psi_{VS}$ the steady-state prediction model $H_{VI}$ is constructed from at least the steady-state prediction model HC chosen according to a condition C1,
the condition C1 is:
The distance between $X_{CT}$ and $\chi_{VIT}$ is minimal;
The cost function of the steady-state prediction model $H_C$ is minimal; or
The generalisation error of the steady-state prediction model $H_C$ is minimal.

The choice of the model H, according to one of the previous embodiments, depends on the data, more particularly the noise level and the amount of data available.

The method comprises a margin calculation step, the margin being proportional to the difference between the matrix of interest $Y_{SI}$ and a matrix $Y_{mp}$, the matrix $Y_{mp}$ being the output of a physical model representative of the worst case for the input $X_{SC}$.

at least one input parameter relating to a turbomachine is an operating parameter of the turbomachine among the following:
Speed of rotation of a first shaft of the turbomachine;
Speed of rotation of a second shaft of the turbomachine;
Temperature of a combustion chamber of the turbomachine;
Torque delivered by the turbomachine;
Any other relevant thermodynamic parameter or a parameter specific to the given environment in which the turbomachine is located, among the following:
Temperature of the given environment;
Pressure of the given environment.
Bleed power
Any other parameter influencing the thermodynamic behaviour of the turbomachine (for example, valve);

at least one output parameter relating to a turbomachine is an operating parameter of the turbomachine among the following:
Speed of rotation of a first shaft of the turbomachine;
Speed of rotation of a second shaft of the turbomachine;
Temperature of a combustion chamber of the turbomachine;

Torque delivered by the turbomachine;

Any other relevant thermodynamic parameter or a parameter specific to the given environment in which the turbomachine is located, among the following:

Temperature of the given environment;

Pressure of the given environment.

Bleed power

Any other parameter influencing the thermodynamic behaviour of the turbomachine (for example, valve)

the prediction model f and the prediction model H are chosen from conventional regression methods, for example, but not limited to, a neural network, a decision tree, a random forest, a wide margin separator or a random polynomial regression, a wide margin separator or a linear regression.

Another aspect of the invention relates to a computer program product comprising instructions which, when the program is executed by a computer, cause the same to implement the method according to the invention.

Another aspect of the invention relates to a computer-readable recording medium comprising instructions which, when executed by a computer, cause the same to implement the method according to the invention.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 shows a schematic representation of a block diagram of the method according to the invention;

FIG. 2 is an example of data recovered during the following flights: (Flight 0, Flight 1, Flight 2, Flight VI) of the turbomachine of interest.

DETAILED DESCRIPTION

The figures are set forth by way of indicating and in no way limiting purposes of the invention.

A first aspect of the invention relates to a method for monitoring the state of health of an aircraft turbomachine of interest TMI for a flight of interest VI, from an setpoint matrix $X_{SC}$ comprising at least one input parameter relating to the steady-state turbomachine of interest TMI.

The aircraft is, for example, an aeroplane or a helicopter.

By "turbomachine", it is meant a system utilising a gas turbine, wherein a transfer of energy is made between a rotating part and a gas.

The following characteristics are true for any type of turbomachine within the scope of the invention, including the turbomachine of interest.

A turbomachine may comprise a combustion chamber, a first shaft and a second shaft.

By "shaft", it is meant a mechanical element for transmitting power as a torque and a rotational movement.

A turbomachine is for example a turbojet engine, a turboprop engine or preferably a turboshaft engine.

By "input parameter relating to a turbomachine", it is meant a parameter relating to the turbomachine for which a setpoint value is desired.

An input parameter relating to the turbomachine may be an operating parameter of the turbomachine among the following: speed of rotation of the first shaft of the turbomachine; speed of rotation of the second shaft of the turbomachine; temperature of the combustion chamber of the turbomachine of interest; and torque delivered by the turbomachine, power delivered by the turbomachine. The input parameter relating to the turbomachine can further be a parameter specific to the external environment in which the aircraft comprising the turbomachine is located during a given flight, among the following parameters: temperature of the external environment; pressure of the external environment. An input parameter relating to the turbomachine can also be any relevant thermodynamic or environmental parameter.

For example, two input parameters may be chosen from parameters relating to the turbomachine previously: a setpoint value of the power delivered by the turbomachine and a setpoint value of the speed of rotation of the first shaft of the turbomachine may be chosen or required.

An output parameter of the turbomachine is a parameter which is a consequence of one or more input parameters of the turbomachine and of the state of the turbomachine.

At least one output parameter relating to the turbomachine of interest may be an operating parameter of the turbomachine among the following: speed of rotation of the first shaft of the turbomachine; speed of rotation of the second shaft of the turbomachine; temperature of the combustion chamber of the turbomachine, torque delivered by the turbomachine and power delivered by the turbomachine.

For example, if the input parameters are: speed of rotation of the first shaft of the turbomachine; speed of rotation of the second shaft of the turbomachine; temperature of the given external environment; pressure of the given external environment, the output parameters relating to the turbomachine may be temperature of the combustion chamber of the turbomachine, and torque delivered by the turbomachine.

In the following, the phrase "parameters relating to the turbomachine" comprises the input parameter(s) relating to the turbomachine and the output parameters relating to the turbomachine.

By "steady state of a turbomachine", it is meant a condition during which the input parameters and the output parameters relating to the turbomachine change little or not at all over time. A steady state can be called a permanent state or stationary state.

A steady state of a turbomachine is the opposite of a transient state of a turbomachine, in which input parameters and output parameters relating to the turbomachine change over time.

The setpoint matrix $X_{SC}$ is a matrix comprising at least one value of at least one input parameter relating to the steady-state turbomachine of interest, each value being able to be randomly generated or selected. The matrix $X_{SC}$ can have a number of rows greater than or equal to 1 and a number of columns greater than or equal to 1. The coefficients of the matrix $X_{SC}$ are denoted as $(x^{SC}_{i,j})_{i \geq 0,\ j \geq 0}$.

FIG. 1 is a block diagram of the method 100 according to the invention.

The method 100 may comprise a first step 101 of constructing a training database.

The construction step 101 may comprise a first sub-step 1011 of recovering data D, for at least one turbomachine TM, the data D being recorded during one or more flight recording instants during at least one flight V of said turbomachine TM.

According to one embodiment, the turbomachine TM is the turbomachine of interest TMI.

According to one embodiment, the data D include data recorded during one or more flight instants of a plurality of flights $(V_0, \ldots V_N)_{N>0}$ of a same turbomachine.

9

10

According to one embodiment, the data D comprise data recorded, for a plurality of turbomachines $(TM_0, \ldots TM_K)_{K>1}$ during one or more flight recording instants of a plurality of flights $(V_{0\text{-}TM0}, \ldots V_{N\text{-}TM0}, V_{0\text{-}TMK} \ldots V_{P\text{-}TMK})_{P>1}$ of a plurality of turbomachines. For each turbomachine of the plurality of turbomachines, the number of flight instants of each flight of the plurality of flights may be different or equal from one flight to another and/or from one turbomachine to another.

According to one embodiment wherein the turbomachine TM is the turbomachine of interest TMI, the flight V performed by the turbomachine of interest is performed prior to the flight of interest VI.

The data D recovered comprise, for each turbomachine TM and for each flight V of the turbomachine TM, transient data recorded during the transient state of the turbomachine TM during at least one flight instant of each flight V of the turbomachine TM, the flight V possibly being the flight of interest VI, and comprise steady-state data recorded during the steady state of the turbomachine TM during at least one flight instant of each flight V, except the flight of interest VI, of the turbomachine TM.

According to one embodiment, for each turbomachine TM and for each given flight V of the turbomachine TM the transient data comprise a pair of matrices $(\chi_{VT}, \psi_{VT})$.

According to the previous embodiment, each matrix $\chi_{VT}$ comprises at least one row and at least one column, each row corresponding to an input parameter of the turbomachine TM, each input parameter of each row being different from the other input parameters of the other rows, and each column corresponding to a recording instant of the flight V during a transient phase, each recording instant of each column being different from the other recording instants of the other columns.

Let $x^T_{V\_ij}$ be a coefficient of the matrix $\chi_{VT}$, $x^T_{V\_ij}$ being equal to the value of the input parameter i for the recording instant j during so-called transient phases of the given flight V. The coefficients i and j are respectively natural numbers greater than or equal to 0. The index V represents the given flight V and the index T represents the transient state.

For example, for a flight V of a transient-state turbomachine TM, for which the values of p input parameters relating to the turbomachine TM are measured, p being an integer greater than 0, the values being measured for I recordings of flight instants, I being greater than 0, the matrix $\chi_{VT}$ is as follows:

$$\chi_{VT} = \begin{bmatrix} x^T_{V\_00} & \cdots & x^T_{V\_0l} \\ \vdots & \ddots & \vdots \\ x^T_{V\_p0} & \cdots & x^T_{V\_pl} \end{bmatrix}$$

According to the previous embodiment, each matrix $\psi_{VT}$, comprises at least one row and at least one column, each row corresponding to the different output parameters of the transient-state turbomachine TM, each column corresponding to the different recording instants of the flight v during a transient phase.

Let $y^T_{V\_ij}$ be a coefficient of the matrix $\psi_{VT}$, $y^T_{V\_ij}$ the value of the output parameter i for the recording instant j during so-called transient phases of the given flight V. The coefficients i and j are respectively natural numbers greater than or equal to 0. The index V represents the given flight V and the index T represents the transient state.

For example, for a flight V of a steady-state turbomachine TM, for which the values of q input parameters relating to the turbomachine TM are measured, q being an integer greater than 0, the values being measured for I recordings of flight instants, I being greater than 0, the matrix $\psi_{VT}$ is as follows:

$$\psi_{VS} = \begin{bmatrix} y^T_{V\_00} & \cdots & y^T_{V\_0l} \\ \vdots & \ddots & \vdots \\ y^T_{V\_q0} & \cdots & y^T_{V\_ql} \end{bmatrix}$$

For each flight V of the turbomachine TM, the flight recording instants of $\chi_{VT}$ correspond to the recording instants of $\psi_{VT}$.

According to one embodiment, the transient data comprise, for each flight V of each turbomachine TM, the matrices $(\chi_{VT})^t$ and $(\psi_{VT})^t$, $(\chi_{VT})^t$ being the transpose of the matrix $\chi_{VT}$ and $(\psi_{VT})^T$ being the transpose of the matrix $\psi_{VT}$.

According to one embodiment complementary to the previous embodiment, for each turbomachine TM and for each given flight V of the turbomachine TM, except the flight of interest VI of the turbomachine of interest, the steady-state data comprise a pair of matrices $(\chi_{VS}, \psi_{VS})$.

Each matrix $\chi_{VS}$ comprises at least one row and at least one column, each row corresponding to an input parameter of the turbomachine TM, each input parameter of each row being different from the other input parameters of the other rows, and each column corresponding to a recording instant of the flight V in steady-state phase, each recording instant of each column being different from the other recording instants of the other columns.

Let $x^S_{V\_ij}$ be a coefficient of the matrix $\chi_{VS}$, $x^S_{V\_ij}$ being equal to the value of the input parameter i for the recording instant j during so-called steady-state phases of the given flight V. The coefficients i and j are respectively natural integers greater than or equal to 0. The index V represents the given flight V and the index T represents the transient state.

For example, for a flight V of a steady-state turbomachine TM, for which the values of p input parameters relating to the turbomachine TM are measured, p being an integer greater than 0, the values being measured for r recordings of flight instants, r being greater than 0, the matrix $\chi_{VS}$ is as follows:

$$\chi_{VS} = \begin{bmatrix} x^S_{V\_00} & \cdots & x^S_{V\_0r} \\ \vdots & \ddots & \vdots \\ x^S_{V\_p0} & \cdots & x^S_{V\_pr} \end{bmatrix}$$

Each matrix $\psi_{VS}$, each comprising at least one column and at least one row, each row corresponding to the different output parameters of the transient-state turbomachine TM, each column corresponding to the different recording instants of the flight v.

Let $y^S_{V\_ij}$ be a coefficient of the matrix $\psi_{VS}$, $y^S_{V\_ij}$ the value of the output parameter i for the recording instant j during so-called transient phases of the given flight V. The coefficients i and j are respectively natural numbers greater than or equal to 0. The index V represents the given flight V and the index T represents the transient state.

For example, for a flight V of a steady-state turbomachine TM, for which the values of q input parameters relating to the turbomachine TM are measured, q being an integer greater than 0, the values being measured for r recordings of flight instants, r being greater than 0, the matrix $\psi_{VS}$ is as follows:

$$\psi_{VS} = \begin{bmatrix} y^S_{V\_00} & \cdots & y^S_{V\_0r} \\ \vdots & \ddots & \vdots \\ y^S_{V\_q0} & \cdots & y^S_{V\_qr} \end{bmatrix}$$

For each flight V of each turbomachine TM, the flight recording instants of $\chi_{VS}$ correspond to the recording instants of $\psi_{VS}$.

According to the embodiment wherein the data D comprise transient data recorded for the turbomachine of interest TMI during at least one flight instant of the flight of interest VI, said transient data comprise matrices $\chi_{VIT}$ and $\psi_{VIT}$.

According to one embodiment complementary to the previous embodiment, for each turbomachine TM, and for each given flight V of the turbomachine TM, the distance between the matrices $\chi_{VIT}$ and $\chi_{VT}$ is less than a threshold S1.

According to one embodiment compatible (but not exclusive) with the previous embodiment, the distance between the matrices $\chi_{VIT}$ and $\psi_{VT}$ is less than a threshold S2.

The distance between the matrices can be any relevant distance, for example a Manhattan distance, a Euclidean distance, a Minkowski distance or a Chebyshev distance.

FIG. 2 is an example of data recovered during the following flights: (Flight 0, Flight 1, Flight 2, Flight VI) of the turbomachine of interest.

The first step 101 of the method according to the invention comprises a second sub-step 1012 for dividing the data D into two sets: a so-called transient set T and a so-called steady-state set S. The transient data for each turbomachine TM and for each flight V of the turbomachine TM are used to construct transient learning data included in the set T, and the steady-state data for each turbomachine TM and for each flight V of the turbomachine TM are used to construct steady-state learning data, are distributed in the set S.

According to one embodiment, the transient learning data of the set T are constructed, for each flight V of each turbomachine TM, the flight V possibly being the flight of interest VI, from the pair $(\chi_{VT}, \psi_{VT})$.

According to the previous embodiment, the transient learning data of the set S are constructed, for each flight V of each turbomachine TM, except the flight of interest VI, from the pair $(\chi_{VS}, \psi_{VS})$.

According to a first sub-embodiment complementary to the previous embodiment, the transient learning data of the set T comprise, for each turbomachine TM, and for each flight V, the pair of matrices $(\chi_{VT}, \psi_{VT})$, the flight V possibly being the flight of interest VI.

According to the first sub-embodiment, the steady-state learning data of the set S comprise, for each turbomachine TM, and for each flight V, except the flight of interest VI of the turbomachine of interest, the pair of matrices $(\chi_{VS}, \psi_{VS})$.

For example, if the recorded data D include data from the flights (V1, V2) of a turbomachine TM, the set T may comprise the following pairs of matrices: $(\chi_{V1T}, \psi_{V1T})$, $(\chi_{V2T}, \psi_{V2T})$ and the set S may comprise the following pairs of matrices: $(\chi_{V1S}, \psi_{V1S})$, $(\chi_{V2S}, \psi_{V2S})$.

For example, if the recorded data D include data recorded during the flights (V1, V2, VI), of the turbomachine of interest TMI, the set T may comprise the following pairs of matrices: $(\chi_{V1T}, \psi_{V1T})$, $(\chi_{V2T}, \psi_{V2T})$ and $(\chi_{VIT}, \chi_{VIT})$ and the set S may comprise the following pairs of matrices: $(\chi_{V1S}, \psi_{V1S})$, $(\chi_{V2S}, \psi_{V2S})$.

According to a second sub-embodiment complementary to the previous embodiment, the transient learning data of the set T comprise a pair of matrices $(X_T, Y_T)$ constructed from each pair $(\chi_{VT}, \psi_{VT})$ for each flight V of each turbomachine TM.

According to the second sub-embodiment, the steady-state learning data of the set S comprise a pair of matrices $(X_S, Y_S)$ constructed from each pair $(\chi_{VS}, \psi_{VS})$ for each flight V of each turbomachine TM, except the flight of interest VI.

According to the second sub-embodiment, the matrix X-results from horizontal concatenation of each matrix $\chi_{VT}$. Thus, when the data D comprise transient data recorded for at least one recording of a flight instant of a plurality of flights $(V_0, \ldots, V_k)_{k>0}$, the matrix $X_T$ is of the following form:

$$X_T = [\chi_{0T} \cdots \chi_{kT}]$$

In order to simplify notations, each flight $V_k$ has been denoted as k in the matrix $X_T$.

According to the previous second sub-embodiment, the matrix $Y_T$ results from horizontal concatenation of each matrix $\psi_{VT}$.

Thus, when the data D comprise transient data recorded for at least one recording of a flight instant of a plurality of flights $(V_0, \ldots, V_k)_{k>0}$, the matrix $Y_T$ is of the following form:

$$Y_T = [\psi_{0T} \cdots \psi_{kT}]$$

In order to simplify notations, each flight $V_k$ has been denoted as k in the matrix $Y_T$.

Each column of $X_T$ and $Y_T$ represents a same flight V.

According to the second sub-embodiment, the matrix $X_S$ results from horizontal concatenation of each matrix $\chi_{VS}$. Thus, when the data D comprise transient data recorded for at least one flight instant of a plurality of flights $V_0, \ldots, V_N)_{N>0}$, the matrix $X_S$ is of the following form:

$$X_S = [\chi_{0S} \cdots \chi_{NS}]$$

In order to simplify notations, each flight $V_N$ has been denoted as N in the matrix $X_S$.

According to the second sub-embodiment, the matrix $Y_S$ results from horizontal concatenation of each matrix $\psi_{VS}$.

Thus, when the data D comprise transient data recorded for at least one recording of a flight instant of a plurality of flights $(V_0, \ldots, V_N)_{N>0}$, the matrix $Y_S$ is of the following form:

$$Y_S = [\psi_{0S} \cdots \psi_{NS}]$$

In order to simplify notations, each flight $V_N$ has been denoted as N in the matrix $Y_S$.

Each row of the matrices $X_T$ and $X_S$ represents a same input parameter relating to a turbomachine TM, and each row of the matrices $Y_T$ and $Y_S$ represents a same output parameter relating to the turbomachine TM.

The method further comprises a second step of estimating 102 a transient prediction model f on the learning data of the transient set T.

According to a first embodiment, wherein the transient learning data of the set T comprise, for each flight V of each turbomachine TM, a pair of matrices $(\chi_{VT}, \psi_{VT})$, the transient prediction model is formed by at least one transient prediction submodel $f_v$ such that $f_v(\chi_{VT}) = \psi_{VT}$ and the estimation step 102 is carried out using the estimation of each model $f_v$.

Thus, when the transient learning data of the set T comprise a plurality of pairs of matrices $(\chi_{V0T}, \psi_{V0T})$, ... $(\chi_{VKT}, \psi_{VKT})_{k>0}$ for the flights $(V_0, \ldots V_K)_{k>0}$ of at least one turbomachine TM, the transient prediction model f can be formed from the submodels $(f_{V0}, \ldots f_V K)_{k>0}$, This formation from the submodels makes it possible to reduce the effect of noise in the data, and to capitalise on the similarities in transient operation of the different turbomachines TM. In particular, according to one embodiment wherein the set T comprises the pair $(\chi_{VIT}, \psi_{VIT})$, the transient prediction model f is formed by at least the transient prediction submodel $f_{VI}$, for the flight of interest VI.

According to a first sub-embodiment of the first embodiment, each transient prediction submodel $f_v$ for each flight V of the transient set T is estimated independently of the other transient prediction submodels. In particular, when the set T comprises the pair of matrices $(\chi_{VIT}, \psi_{VIT})$ corresponding to the flight of interest VI of the turbomachine of interest TMI, and the transient prediction model f is formed from at least the submodel $f_{VI}$.

According to the first embodiment, each transient prediction model $f_v$ can be a model chosen from all the conventional regression models, for example a neural network, a regression tree, a random forest, a wide margin separator or a linear regression.

According to a second sub-embodiment of the first embodiment, each transient prediction submodel $f_v$ for each flight V of the transient set T is estimated dependently on the other transient prediction submodels by using a multi-task learning method. This multi-task learning makes it possible to reduce noise in data and cover all parts of data seen by each transient, rather than a reduced set. This increased coverage is what makes it possible to evaluate the margins over many operating points and therefore to have a finer and more precise analysis of the margins of the turbomachine under consideration.

Multi-task learning is a sub-field of machine learning that enables several different tasks to be solved simultaneously, while taking account of the dependencies between the tasks. A multi-task learning model comprises a part common to each task and a part specific to each task. Multi-task learning makes it possible to improve the learning of a particular model by using the characteristics included in all the tasks. Thus, according to the second embodiment, for each flight V of each turbomachine TM, each prediction submodel $f_v$ is equal to $\varphi \circ F_V$, the function $\varphi$ being common to each model $f_V$ and the function $F_V$ being specific to each submodel fv.

The multitask learning model can be a model chosen from a neural network, a regression tree, a random forest, a wide margin separator or a linear regression.

For example, each prediction submodel $f_V$ can be associated with a set of training parameters, some of which are common to all the other prediction submodels, and some of which are specific to said model.

According to the first embodiment, the estimation of each transient prediction model $f_v$ is carried out by minimising a cost function corresponding to the error between the output data $f_v(\chi_{VT})$ provided by the transient prediction model f and the desired true output data $\psi_{VT}$.

According to the first embodiment, for each flight V, the cost function is, for example, the mean square deviation between $f_v(\chi_{VT})$ and $\psi_{VT}$. As a reminder, the coefficients of the matrix $\chi_{VT}$ are denoted as $(x^T_{v\_ij})_{i0, \ j\geq 0}$ and the coefficients of the matrix $\psi_{VT}$ are denoted as $(y^T_{v\_ij})_{i\geq 0, \ j\geq 0}$. The coefficients of the matrix $f_v(\chi_{VT})$ will be denoted as $(f(x^T_{v\_ij})_{i\geq 0, \ j\geq 0}$. Thus, the cost function can be equal to:

$$\sum_j \sum_j \left( y^T_{v\_ij} - \left( f_v \left( x^T_{v\_ij} \right) \right) \right)^2.$$

Minimisation of the cost function can be carried out by using the gradient descent algorithm or by using the least squares algorithm or any method for optimising the estimation of each submodel $f_v$ of the state of the art.

According to a second embodiment, wherein the set T comprises the matrix $X_T$ and the matrix $Y_T$, step 102 of estimating the transient prediction model f models the relationship between the matrix $X_T$ and the matrix $Y_T$ such that $f(X_T) = Y_T$, f is referred to as the overall transient prediction model in this embodiment.

According to the second embodiment, the transient prediction model f can be a model chosen from all the conventional regression models, for example a neural network, a regression tree, a random forest, a wide margin separator or a linear regression.

According to the second embodiment, the estimation of the transient prediction model f is carried out by minimising a cost function corresponding to the error between the output data $f(X_T)$ provided by the transient prediction model f and the desired true output data $Y_T$.

According to the second embodiment, the cost function is, for example, the mean square deviation between $f(X^T)$ et $Y_T$. As a reminder, the matrix $X_T$ may be equal to the columns $(\chi_{VT})_{v\geq 1}$. The coefficients of the matrix $f(X^T)$ will be denoted as $(f(x^T_{V\_ij}))_{i\geq 0, \ j\geq 0 \ v\geq 0}$. Thus, the cost function can be equal to:

$$\sum_j \sum_j \left( y^T_{v\_ij} - \left( f \left( x^T_{v\_ij} \right) \right) \right)^2.$$

Thus, the transient prediction model f can be defined such that, for each flight V of each turbomachine TM, f is formed by at least one submodel fv defined such that $f_v(\chi_{VT}) = \psi_{VT}$ or can be defined such that $f(X_T) = Y_T$.

The method 100 further comprises a step 103 of estimating a steady-state prediction model H, as a function of the transient model f and the set S.

According to a first embodiment, wherein the transient model f is formed by at least one transient submodel $f_v$ for each flight V of the transient set T, the steady-state prediction model H is defined, for each flight V of the set S, represented by the pair of matrices $(\psi_{VS}, \chi_{VS})$, such that $H(f_v(\chi_{VS}), \chi_{VS}) = \psi_{VS}$.

According to the first embodiment, step 103 of estimating the steady-state prediction model H is carried out by minimising a cost function, the cost function being for example equal to:

$$\sum_V \sum_i \sum_j \left( y^S_{V\_ij} - H \left( f_V \left( x^S_{v\_ij} \right), x^S_{V\_ij} \right) \right)^2.$$

The index V represents each 2 flight of the set S, the index i represents a flight instant of the flight V and the index j represents an input parameter of a turbomachine TM for a coefficient $$x_{V\_ij}^{S}$$

and j represents an output parameter of the same turbomachine TM for a coefficient $$y_{V\_ij}^{S}$$

Minimisation of the cost function can be carried out by using the gradient descent algorithm or by using the least squares algorithm or any optimisation method of the state of the art.

According to a second embodiment, wherein the transient set T comprises the matrices $X_T$ and $Y_T$ and the steady-state set S comprises the matrices $X_S$ and $Y_S$ and wherein the transient prediction model f is defined such that $f(X_T)=Y_T$, the steady-state prediction model H is defined such that $Y_S=H(f(X_S),X_S)$.

According to the second embodiment, the estimation of the steady-state prediction model H is carried out by minimising a cost function, the cost function being for example equal to:

$$\sum_V \sum_i \sum_j \left( y_{V\_ij}^{S} - H\left( f\left( x_{v\_ij}^{S} \right), x_{V\_ij}^{S} \right) \right)^2.$$

The index V represents each flight of the set S, the index i represents a flight instant of the flight V and the index j represents an input parameter of a turbomachine TM for a coefficient $$x_{V\_ij}^{S}$$

and j represents an output parameter of the same turbomachine TM for a coefficient $$y_{V\_ij}^{S}$$

Minimisation of the cost function can be carried out by using the gradient descent algorithm or by using the least squares algorithm or any optimisation method of the state of the art.

The prediction model H can be a model chosen from a neural network, a regression tree, a random forest, a wide margin separator or a linear regression, but not exclusively.

According to another embodiment, wherein the transient set T comprises the matrices $X_T$ and $Y_T$ and the steady-state set S comprises the matrices $X_S$ and $Y_S$ and wherein the transient prediction model f is defined such that $f(X_T)=Y_T$, step 103 of estimating the steady-state prediction model H comprises, for each flight V of each turbomachine TM, except the flight of interest VI, a step of estimating a steady-state prediction model $H_V$ from the transient prediction model f and steady-state learning data for each recording instant of flight V, included in the steady-state set S.

According to a first embodiment, each steady-state prediction submodel $H_v$ for each flight V in the steady-state set S is estimated independently of the other steady-state prediction models.

Each steady-state prediction model $H_v$ can be a model chosen from all the conventional regression models, for example a neural network, a regression tree, a random forest, a wide margin separator or a linear regression. The linear regression can be a polynomial regression, for example.

In a first embodiment, the estimation of each steady-state prediction model $H_v$ is carried out by minimising a cost function corresponding to the error between the output data $H_V$ $(f(\chi_{VS}),\chi_{VS})$ provided by the steady-state prediction model $H_V$ and the desired true output data vs.

According to one embodiment compatible with the previous first embodiment, for the estimation of each steady-state prediction model $H_V$, the cost function is for example the mean square deviation between $H_V$ $(f(\chi_{VS}),\chi_{VS})$ and vs. As a reminder, the coefficients of the matrix $\chi_{VS}$ are denoted as $(x^{T}_{v\_ij})_{i0,\ j\geq0}$ and the coefficients of the matrix $\psi_{VS}$ are denoted as $$\left( y_{v\_ij}^{T} \right)_{i\geq0,j\geq0}.$$

The coefficients of the matrix $f_v(\chi_{VS})$ will be denoted as $(f(x^{S}_{v\_ij}))_{i\geq0,\ j\geq0}$. Thus, the cost function can be equal to:

$$\sum_j \sum_i \left( y_{v_{ij}}^{S} - \left( H_V \left( f\left( x_{v_{ij}}^{S} \right), x_{v_{ij}}^{S} \right) \right) \right)^2.$$

Minimisation of the cost function can be carried out by using the gradient descent algorithm or by using the least squares algorithm or any optimisation method of the state of the art allowing the estimation of each submodel $H_v$.

In a second embodiment, each steady-state prediction model $H_v$ for each flight V of the transient set S is estimated dependently on the other steady-state prediction models by using a multi-task learning method.

Multi-task learning is a sub-field of machine learning that allows several different tasks to be solved simultaneously while taking account of the dependencies between the tasks. A multi-task learning model comprises a part common to each task and a part specific to each task. Multi-task learning makes it possible to improve the learning of a particular model by using the characteristics included in all the tasks. Thus, according to the second embodiment, for each flight V of each turbomachine TM, each prediction submodel $H_V$ is equal to $\varphi \circ h_V$, the function $\varphi$ being common to each model $H_V$ and the function fv being specific to each submodel fv.

The multitask learning model can be a model chosen from a neural network, a regression tree, a random forest, a wide margin separator or a linear regression.

For example, each prediction model $H_V$ can be associated with a set of training parameters, some of which are common to all the other prediction submodels, and some of which are specific to said model.

This second embodiment is advantageous because it allows the decrease of the cost function for estimating each steady-state prediction model $H_V$ in the event that the steady-state data in the set S are noisy or sparse.

Step 103 of estimating the steady-state prediction model H may comprise, in this embodiment, a step of constructing a steady-state prediction model $H_{VI}$ for the flight of interest VI, from at least one steady-state prediction model $H_V$, the model H being the model $H_{VI}$ in this case.

According to one embodiment, the steady-state prediction model $H_{VI}$ is constructed from at least one chosen steady-state prediction model $H_C$, the prediction model $H_C$ being estimated as a flight C, the flight C being chosen from a plurality of flights V when there are several flights V, and being the flight V when there is only one flight V. The steady-state prediction model $H_C$ is chosen from the estimated steady-state prediction models $H_V$, according to a condition C1.

The steady-state prediction model $H_{VT}$ can be constructed from a prediction model $H_C$ chosen such that $H_{VT}$ can be proportional or equal to the steady-state prediction model $H_C$.

According to one embodiment wherein the transient learning data included in the set T are constructed from a plurality of pairs of matrices $(\chi_{VT}, \psi_{VT})$ for each flight V, including the pair $(\chi_{CT}, \psi_{CT})$ corresponding to the flight C, and from the pair of matrices $(\chi_{VTT}, \psi_{VTT})$, the condition C1 for choosing a prediction model $H_C$ to construct the model $H_{VT}$ may be a condition on the distance between the matrices $\chi_{VTT}$ and $\chi_{CT}$.

For example, the distance between the matrices $\chi_{VTT}$ and $\chi_{CT}$ is less than a threshold S3, S3 being for example a positive real or zero.

For example, the distance between the matrices $\chi_{VTT}$ and $\chi_{CT}$ is minimal compared with the respective distances between each matrix $\chi_{VT}$ for each flight V and the matrix $\chi_{VTT}$.

According to one embodiment wherein the steady-state learning data included in the set S are constructed from a plurality of pairs of matrices $(\chi_{VS}, \psi_{VS})$ for each flight V, including the pair $(\chi_{CS}, \psi_{CS})$ corresponding to the flight C, the condition C1 for choosing the steady-state prediction model HC to construct the model $H_{VT}$ may be a condition on the cost function minimising, for the flight C, the deviation between the matrix $H_V(f(\chi_{CS}), \chi_{VC})$ and the matrix $\psi_{CS}$. The condition C1 may be for example: the steady-state prediction model $H_C$ chosen is the model having the minimum cost function compared with the other cost functions of each steady-state prediction model $H_V$ for each flight V of each turbomachine TM of the steady-state set S.

According to one embodiment wherein the steady-state learning data included in the set S are constructed from several pairs of matrices, for example the set of the following pairs of matrices $((\chi_{VS}, vs), 1<V\leq N$, N being an integer strictly greater than 1, and wherein steady-state prediction models $(H_V)_{1<V\leq N}$ have been estimated in a sub-step of step 103 of the method 100, the steady-state prediction model $H_{VT}$ can be constructed from a weighted mean of k steady-state prediction models among the N steady-state prediction models $(H_V)_{1<V\leq N}$, k being an integer of between 1 and N, the condition C1 being on the number of k, for example the k steady-state prediction models among the set of N steady-state prediction models $(H_V)_{1<V\leq N}$ having the k smallest cost functions among the N cost functions.

According to one embodiment wherein the steady-state learning data included in the set S are constructed from a plurality of pairs of matrices $(\chi_{VS}, \psi_{VS})$ for each flight V, including the pair $(\chi_{CS}, \psi_{CS})$ corresponding to the flight C, the condition C1 for choosing the steady-state prediction model HC to construct the model $H_{VT}$ may be a condition on the generalisation error of the model $H_C$ on the data included in the set S except the data relating to the flight C.

By "generalisation error of a model", it is meant the capacity of the model to be able to make robust predictions on new data, not used during learning.

According to the previous embodiment, the condition C1 may be, for example: the steady-state prediction model $H_C$ chosen is the model having the minimum generalisation error compared with the other respective generalisation errors of each steady-state prediction model $H_V$ for each flight V of each turbomachine TM of the steady-state set S.

According to one embodiment wherein the steady-state learning data included in the set S are constructed from several pairs of matrices, for example the set of the following pairs of matrices $(\chi_{VS}, \psi_{VS})$, $1<<N$, N being an integer strictly greater than 1, and wherein steady-state prediction models $(H_V)_{1<V\leq N}$ have been estimated in step 103 of the method 100, the steady-state prediction model $H_{VT}$ can be constructed from a weighted mean of k steady-state prediction models among the N steady-state prediction models $(H_V)_{1<V\leq N}$, k being an integer of between 1 and N, the condition C1 being on the number of k, for example the k steady-state prediction models among the set of N steady-state prediction models $(H_V)_{1<V\leq N}$ having the k smallest generalisation errors among the N generalisation errors.

The method 100 further comprises a step 104 of estimating a matrix $Y_{SI}$, of values of output parameters relating to the turbomachine of interest for at least one flight instant of the flight of interest as a function of the model H associated with the vector with the matrix $X_{SC}$ and at least a part of the transient model f.

According to a first embodiment, wherein the transient model f is formed by at least one submodel $f_v$ for each flight V of the set T, and in particular by the submodel $f_{VT}$, the part of the transient model f is the submodel $f_{VT}$, and the matrix $Y_{SI}$ is estimated as a function of the model H associated with the matrix $f_{VT}(X_{SC})$ and with the matrix $X_{SC}$ such that $Y_{SI}=H(f_{VT}(X_{SC}), X_{SC})$.

According to a second embodiment, wherein the transient model f is the overall transient prediction model such that $f(X_T)=Y_T$, and in particular the submodel $f_{VT}$, the part of the transient model f is the overall transient prediction model f, and the matrix $Y_{SI}$ is estimated as a function of the model H associated with the matrix $f(X_{SC})$ and the matrix $X_{SC}$ such that $Y_{SI}=H(f(X_{SC}), X_{SC})$.

According to a third embodiment, wherein H is the model $H_{VT}$, the matrix $Y_{SI}$ is defined such that $Y_{SI}=H_{VT}(f(X_{SC}), X_{SC})$.

The method 100 may further comprise a margin calculation step 105, the margin being proportional to the difference between the matrix of interest $Y_{SI}$ and a matrix $Y_{mp}$, the matrix $Y_{mp}$ being the output of a physical model representative of the worst case for the input $X_{SC}$, the worst case representing the most degraded engine possible before the problem. Thus, according to one embodiment, the margin calculation is performed as follows: margin=$Y_{SI}-Y_{mp}$.

An estimate of the state of health of the engine is carried out from the margin calculation depending on the matrix of interest $Y_{SI}$.

Monitoring the health of the turbomachine of interest TMI can thus be carried out using the margin calculation.

Another aspect of the invention relates to a computer configured to implement the method according to the first aspect of the invention.

The invention claimed is:

1. A method, implemented by computer, for monitoring a state of health of a turbomachine of interest of an aircraft for a flight of interest of the aircraft, from a setpoint matrix comprising at least one value of at least one input parameter relating to the turbomachine of interest TMI, the method comprising:

constructing a training database comprising:

a transient set including transient learning data recorded during at least one flight recording instant of at least one flight of at least one turbomachine operating in transient state and of the flight of interest of the turbomachine of interest;

a steady-state set including steady-state learning data recorded at each flight recording instant of each flight, except the flight of interest, of each turbomachine operating in steady state;

estimating a transient prediction model f from the transient learning data of the transient set;

estimating a steady-state prediction model H from the transient prediction model f and the steady-state learning data included in the steady-state set;

estimating a matrix of interest $Y_{SI}$ representing the behaviour of the steady-state turbomachine of interest for the flight of interest from the steady-state prediction model H, at least a part of the transient prediction model f and the setpoint matrix $X_{SC}$;

estimating the state of the turbomachine of interest from a margin calculation dependent on the matrix of interest $Y_{SI}$.

2. The method according to claim 1, wherein the turbomachine is the turbomachine of interest.

3. The method according to claim 1, wherein:

the transient learning data of the transient set are constructed, for each flight of each turbomachine, from a pair $(\chi_{VT}, \psi_{VT})$:

the matrix $\chi_{VT}$, comprising at least one row and at least one column, each row corresponding to an input parameter of the turbomachine operating in transient state, each input parameter of each row being different from the other input parameters of the other rows, each column corresponding to a recording instant of the flight, each recording instant of each column being different from the other recording instants of the other columns, the matrix $\psi_{VT}$, comprising at least one row and at least one column, each row corresponding to an output parameter of the turbomachine operating in transient state, each output parameter of each row being different from the other input parameters of the other rows, each column corresponding to a recording instant of the flight, each recording instant of each column being different from the other recording instants of the other rows, the steady-state learning data of the steady-state set are constructed, for each flight of each turbomachine, except the flight of interest, from the pair $(\chi_{VS}, \psi_{VS})$:

the matrix $\chi_{VS}$, comprising at least one row and at least one column, each row corresponding to an input parameter of the turbomachine operating in transient state, each input parameter of each row being different from the other input parameters of the other rows, each column corresponding to a recording instant of the flight-V, each recording instant of each column being different from the other recording instants of the other columns, the matrix $\psi_{VS}$, comprising at least one row and at least one column, each row corresponding to an output parameter of the turbomachine operating in transient state, each output parameter of each row being different from the other input parameters of the other rows, each column corresponding to a recording instant of the flight, each recording instant of each column being different from the other recording instants of the other columns.

4. The method according to claim 3, wherein a flight Y of the set is the flight of interest and the transient set is further constructed from the pair $(\chi_{VTT}, \psi_{VTT})$.

5. The method according to claim 3, wherein, for each flight of each turbomachine of the transient set:

the transient learning data of the transient set comprise the pair $(\chi_{VTT}, \psi_{VTT})$:

the transient prediction model is formed by at least one submodel $f_v$, such that $f_v(\chi_{VT}) = \psi_{VT}$.

6. The method according to claim 5, wherein the steady-state prediction model H is defined such that, for each flight of each turbomachine of the steady-state set, $H(f_v(\chi_{VS})\chi_{VS}) = \psi_{VS}$.

7. The method according to claim 3:

the transient learning data of the transient set comprise:

a matrix $X_T$ resulting from horizontal concatenation of each matrix $\chi_{VT}$, a matrix $Y_T$ resulting from horizontal concatenation of each matrix $\psi_{VT}$, and wherein the transient prediction model f is defined as $f(X_T) = Y_T$.

8. The method according to claim 7, wherein the steady-state learning data of the steady-state set comprise:

a matrix $X_S$ resulting from horizontal concatenation of each matrix $\chi_{VS}$, a matrix $Y_S$ resulting from horizontal concatenation of each matrix $\psi_{VS}$, and wherein the steady-state prediction model H is defined such that $H(f(X_S), X_S) = Y_S$.

9. The method according to claim 4, wherein the estimating of a steady-state prediction model H from the transient prediction model f and the steady-state learning data included in the steady-state set comprises the following sub-steps:

for each flight of each turbomachine, except the flight of interest, estimating a steady-state prediction model Hv from the transient prediction model f and the steady-state learning data of each flight recording instant of the flight, included in the steady-state set;

constructing a steady-state prediction model $H_{VI}$ for the flight of interest, from at least one steady-state prediction model $H_C$ estimated for a flight, the flight being one flight of the flight or flights;

the steady-state prediction model H being the steady-state prediction model $H_{VI}$.

10. The method according to claim 9, wherein, for each flight of each turbomachine of the steady-state set, except the flight of interest of the turbomachine of interest:

the steady-state learning data of the steady-state set comprise the pair $(\chi_{VS}, \psi_{VS})$ the steady-state prediction model Hv is defined such that $Hv(f(\chi_{VS}), \chi_{VS}) = \psi_{VS}$.

11. The method according to claim 9, wherein the steady-state prediction model $H_{VI}$ is constructed from at least the steady-state prediction model $H_C$ chosen according to a condition.

12. The method according to claim 11, wherein the condition is:

the distance between $\chi_{CT}$ and $\chi_{VIT}$ is minimal;

the cost function of the steady-state prediction model $H_C$ is minimal; or the generalisation error of the steady-state prediction model $H_C$ is minimal.

13. The method according to claim 1, including a margin calculation step, the margin being proportional to the difference between the matrix of interest $Y_{SI}$ and a matrix $Y_{mp}$, the matrix $Y_{mp}$ being the output of a physical model representing the worst case for the input $X_{SC}$.

14. A computer program product comprising instructions which, when the program is executed by a computer, cause the same to implement the method according to claim 1.

15. A non-transitory computer-readable medium comprising instructions which, when executed by a computer, cause the same to implement the method according to claim 1.

\* \* \* \* \*